United States Patent [19]

Phillips et al.

[11] Patent Number: 5,051,894
[45] Date of Patent: Sep. 24, 1991

[54] APPARATUS AND METHOD FOR ADDRESS TRANSLATION OF NON-ALIGNED DOUBLE WORD VIRTUAL ADDRESSES

[75] Inventors: Forrest M. Phillips, North Chelmsford; Thomas F. Joyce, Westford; Ming T. Miu, Chelmsford, all of Mass.

[73] Assignee: Bull HN Information Systems Inc., Billerica, Mass.

[21] Appl. No.: 294,528

[22] Filed: Jan. 5, 1989

[51] Int. Cl.[5] .......................... G06F 9/26; G06F 12/04
[52] U.S. Cl. .................................... 364/200; 364/259; 364/243.41; 364/246.7; 364/256.3; 364/260.4; 364/939.2
[58] Field of Search ............................. 364/200, 900

[56] References Cited

U.S. PATENT DOCUMENTS

| | | | |
|---|---|---|---|
| 3,916,385 | 10/1975 | Parmar | 364/200 |
| 4,104,718 | 8/1978 | Poublan | 364/200 |
| 4,177,510 | 12/1979 | Appell | 364/200 |
| 4,319,324 | 3/1982 | Johnson | 364/200 |
| 4,361,869 | 11/1982 | Johnson | 364/200 |
| 4,376,972 | 3/1983 | Johnson | 364/200 |
| 4,378,591 | 3/1983 | Lemay | 364/200 |
| 4,385,352 | 5/1983 | Bienvenu | 364/200 |
| 4,438,493 | 3/1984 | Cushing | 364/200 |
| 4,475,194 | 10/1984 | LaVallee | 364/200 |
| 4,597,041 | 6/1986 | Guyer | 364/200 |
| 4,597,044 | 6/1986 | Circello | 364/200 |
| 4,787,031 | 11/1988 | Karger | 364/200 |
| 4,799,149 | 1/1989 | Wolf | 364/200 |
| 4,851,993 | 7/1989 | Chen | 364/200 |
| 4,866,599 | 9/1989 | Morganti | 364/200 |
| 4,961,162 | 10/1990 | Mguyenphu | 364/748 |

*Primary Examiner*—Thomas C. Lee
*Assistant Examiner*—Eric Coleman
*Attorney, Agent, or Firm*—Faith F. Driscoll; John S. Solakian; William W. Holloway

[57] ABSTRACT

In a data processing system in which the execution unit is implemented to process aligned double word operands, apparatus and an associated method provide for the alingment of a double word operand that is stored across a double work boundary. The two double words each storing a word of the unaligned double word operand are identified and the attributes are compared with the ring number of the associated program. When the comparisons indicate that the two words of the non-aligned double word operand are available to the program, the two double word operands containing the non-aligned words of the double word operand, and the two non-aligned words are stored in a register in an aligned orientation for processing by the execution unit.

16 Claims, 7 Drawing Sheets

| PERIOD NO. 1 | PERIOD NO. 2 | PERIOD NO. 3 | PERIOD NO. 4 | PERIOD NO. 5 | PERIOD NO. 6 |
|---|---|---|---|---|---|
| V-RDY=0<br>$\overline{SCND}$<br>TRANSLATE<br>PLUS ONE | V-RDY=0<br>SCND<br>TRANSLATE | V-RDY=0<br>$\overline{SCND}$<br>V-VAL<br>EO=READ FIRST | V-RDY=1<br>SCND<br>V-VAL<br>EO=READ SECOND | (NEXT) | (NEXT) |
| | | | READ RAM<br>LOAD OUTPUT<br>LD-DAT-16-31 | READ RAM<br>LOAD OUTPUT<br>LD-DAT-0-15 | |

VMMU (periods 1–4), E-CACHE (periods 4–5)

Fig. 6

APPARATUS AND METHOD FOR ADDRESS TRANSLATION OF NON-ALIGNED DOUBLE WORD VIRTUAL ADDRESSES

BACKGROUND OF THE INVENTION

1. Field of the Invention

This invention relates generally to data processing systems and, more particularly, to data processing systems in which a data processing unit identifies a data group by a first (virtual) address while the same data group is identified in the memory unit by a second (real) address.

2. Description of the Related Art

In the multiprocessor, multiprogramming data processing systems, the allocation of memory locations for each program, formerly under the control of the programmer, has now become the province of the operating system. The program identifies data groups by virtual addresses, the virtual addresses being only indirectly related to a physical location in the memory space of the data processing system. The use of the virtual addressing technique permits the data processing unit to have access to a large data storage facility even though only a small fraction of the available data groups will be resident in the memory unit at any one time. On the other hand, the real address of a data group relates to a physical memory location. The operating system has the responsibility for establishing the correspondence of the virtual addresses used by the executing program and the real addresses having significance for the data processing system. In the data processing system, a translation unit, typically referred to as the virtual memory management unit, provides an address in the memory unit in response to a virtual address used by the executing program. The virtual memory management unit includes apparatus for insuring that a data processing system program does not access inappropriate data groups.

In the modern data processing system, the data groups are typically organized into consecutive blocks. Because data groups which are potentially capable of being processed in close temporal proximity are stored in neighboring memory locations, a high probability exists that a data group of a neighboring memory location will be required relatively soon after the originally required data group is processed. The transfer of blocks of consecutive data groups to a data processing system for each memory read operation can reduce the number of memory accesses required to execute a program sequence. In the preferred embodiment, a block of data includes two double words, or 32 bits. Each word is addressed by a 32 bit address of the form illustrated in FIG. 4. The bits 0 and 1 identify a ring number that relates to execution privileges (parameters) of the program. Bits 2 through 11 identify the segment number, the coursest granularity for the identification of storage addresses. Bits 12 through 21 relate to a page number, the page being the unit of storage in the memory unit. Bits 22 through 31 identify the address offset, the offset address defining the relative location of the data group within the page.

The execution unit is implemented to process properly aligned double word operands. When the double word boundary is strictly enforced in a data processing system, then bit 31 of the virtual address would be redundant. As a practical matter, a double word can begin with the second word of the double word, or when bit 31 is a logic "1" signal. When bit 31 is a logic "1", then the second word is across the normal double word boundary and is the first word of the next double word. As a practical matter, this boundary crossing can cause problems with respect to the access of the second word. First, the addition of a logic "1" to the logic "1" of bit 31 can result in a memory address that is currently stored in the memory unit. Second, when the address offset consists of all logic "1"s in bit positions 22 through 31, the addition of a logic "1" to determine the second word of the double word will fall in a next page, a page that may not be present in the main memory. In this situation, the operating system be invoked to move the missing page into main memory. Finally, if the page number and the address offset, i.e., bits 12 through 31 are all logic "1"s, then the addition of a logic "1" to the 31 bit position results in a new segment being identified. Each segment can have different privileges associated therewith so that the second word of the double word may not be accessible to the currently executing instruction.

Therefore, a need has been felt for a virtual memory management unit in a data processing system that can provide the two words of a double word that cross a double word boundary or, in the alternative indicate why the double word can not be provided.

FEATURES OF THE INVENTION

It is an object of the present invention to provide an improved data processing system.

It is a feature of the present invention to provide an improved data processing unit in which virtual addresses are used to identify data groups.

It is another feature of the present invention to provide apparatus for aligning a double word operand that is stored across a double word boundary.

It is yet another feature of the present invention to compare attributes of two double word operands, each operand containing a word of a required operand stored across a double word boundary.

SUMMARY OF THE INVENTION

The aforementioned and other features are attained, according to the present invention, by providing apparatus for identifying when an operand to be read from the E-cache memory unit crosses a double word boundary. When the boundary crossing operand is identified, the VMMU unit compares the attributes associated with the virtual addresses of each word of the required double word with the ring number associated with the virtual address. When the comparison indicates that the required double word operand is available to the program, then each virtual address is translated into a real address of a double word which includes one word of the required double word. The two words of the required double word are stored in a register in the correct order and the required double word is available to the execution unit for processing.

These and other features of the invention will be understood upon reading of the following description along with the drawings.

DESCRIPTION OF THE PREFERRED EMBODIMENT

1. Detailed Description of the Figures

The present invention is adapted to function in a data processing unit in which certain types of instructions are executed by an earlier unit and dropped out of the production line while other types of instructions are executed at the end of the production line. The address unit of the data processing unit according to the present includes means for executing the instruction if it is a "non memory" instruction. The "non-memory" instruction, by having been executed during the third cycle of operation, is effectively dropped or removed from the production line and therefore requires no further cycles in the production line, thereby improving the system throughput.

Figure 1:
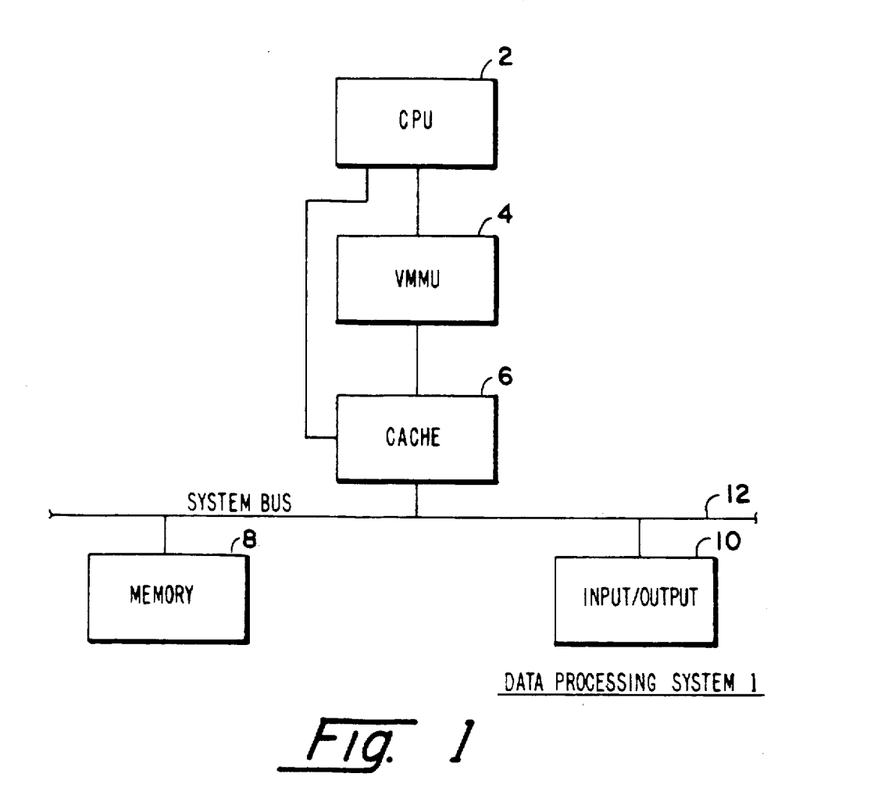
FIG. 1 is a block diagram of the overall system which includes the apparatus of the present invention.

FIG. 1 shows a block diagram of a cycle production pipeline data processing system 1. Included are a central processing unit (CPU) 2, a virtual memory management unit (VMMU) 4, a cache unit 6, a memory subsystem 8, and input/output peripheral unit 10. The cache unit 6, memory subsystem 8, and input/output peripheral unit 10 are all coupled in common to a system bus 12. The memory 8 stores instructions and operands. Those operands and instructions, having the highest probability of being executed immediately, are transferred to cache unit 6 from the memory subsystem 8.

The CPU 2 receives instructions from the cache unit 6 and, in the execution of these instructions, sends the virtual address portion of the instruction to VMMU 4. The VMMU 4 translates the virtual address into a physical address which is applied to cache unit 6 for fetching the necessary operands to allow the CPU 2 to execute the instructions.

The input/output unit 10 represents typically any number of peripheral controllers with their devices, or an input/output processor which controls peripheral controllers and devices, or it may represent typically a communications subsystem.

Figure 2:
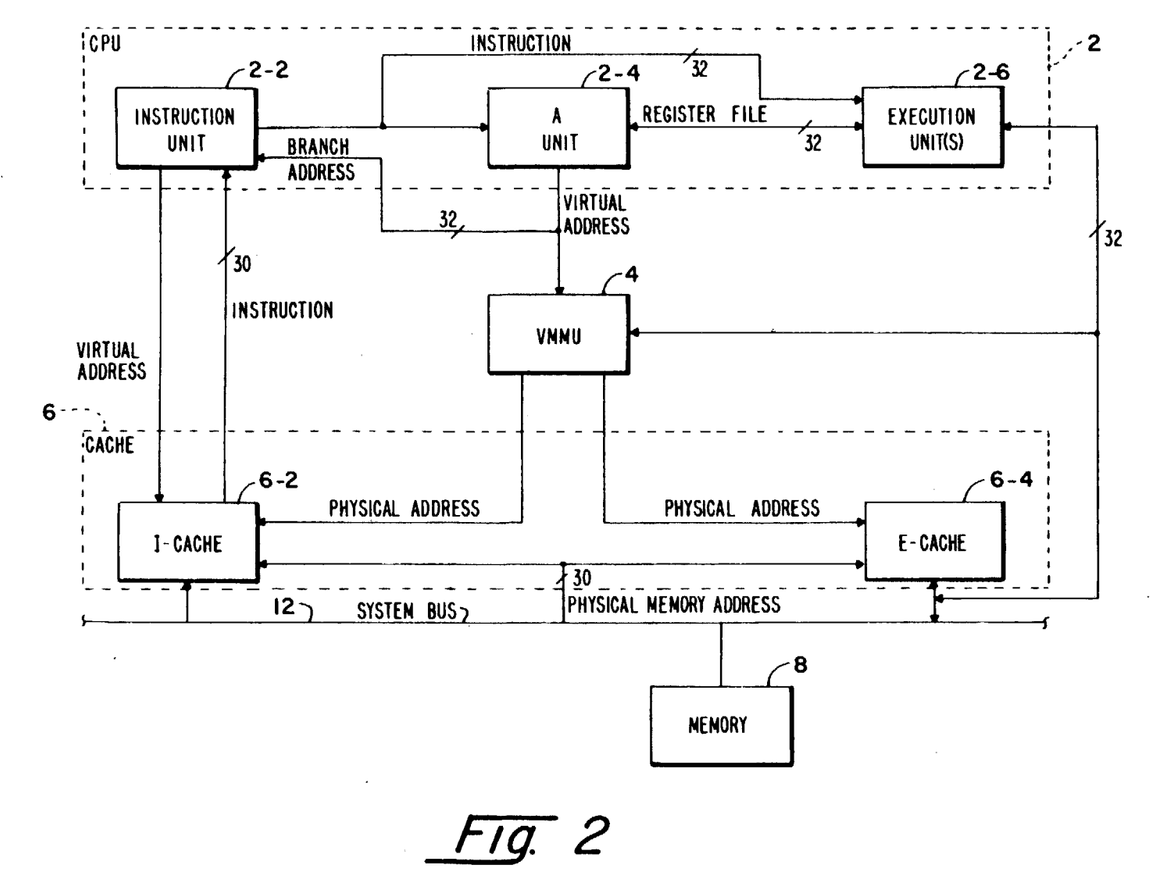
FIG. 2 is a more detailed block diagram of the overall system of FIG. 1.

FIG. 2 shows in block diagram form the major elements that make up the CPU 2 and the cache unit 6. The CPU 2 includes an instruction (I) unit 2-2, an A unit 2-4, and a number of execution (E) units 2-6. The execution units 2-6 could be a scientific instruction processor or a commercial instruction processor. However, for simplicity of description, only the operation of one of the execution units 2-6 is described which is sufficient to understand the invention.

The cache unit 6 includes an I-cache 6-2 and an E-cache 6-4. The I-cache 6-2 stores the instructions that are to be executed and the E-cache 6-4 stores the operands upon which the instructions operate. The I-unit 2-2 performs essentially two functions. It prefetches instructions from I-cache 6-2 and then cracks those instructions to determine how the other units, namely the A unit 2-4 and the E unit 2-6, will further process the instruction.

The A unit 2-4 receives the instruction from the I-unit 2-2 and executes the instruction if it is a register-to-register instruction or a branch instruction. When the instruction is to be executed by the E unit 2-6, the A unit 2-4 sends a virtual address to the VMMU 4 which translates it into a physical address for the E-cache unit 6-4. E-cache 6-4 sends the operands to the E unit 2-6 for the completion of the execution of the instruction originally received by the instruction unit 2-2 from the I-cache unit 6-2.

The A unit 2-4 will also complete the execution of branch instruction and send the branch address back to the instruction unit 2-2 so that it may request the next instruction at the location in I-cache 6-2 specified by the branch address. Both the A unit 2-4 and the E unit 2-6 include register files which store the contents of the registers which are accessible to the programmers, that is, the so called software visible registers. Both the I-cache 6-2 and the E-cache 6-4 are coupled to system bus 12 and their contents are updated with instructions and operands received from memory 8.

Instructions are executed in a production pipeline fashion by the elements of CPU 2. That is, the I unit 2-2 receives an instruction from I-cache 6-2, cracks it, and then sends the instruction to the A unit 2-4. The A unit 2-4 either executes the instruction or sends the virtual address to the VMMU 4 for translation in order to address the E-cache 6-4. E-cache 6-4 sends the designated operands to the E unit 2-6.

While the A unit 2-4 is executing its portion of the first instruction from the I unit 2-2, the I unit 2-2 is fetching the second instruction and subsequent instructions from I-cache 6-2. When the A unit 2-4 sends the virtual address specified by the first instruction to the VMMU 4 and notifies the I unit 2-2 of that event, the I unit 2-2 sends the second instruction to the A unit 2-4. The VMMU 4 addresses the E-cache 6-4 while the A unit 2-4 is processing the second instruction in the pipeline. When the E unit 2-6 is executing the first instruction, the VMMU 4 may be addressing E-cache 6-4 to fetch the operands of the second instruction while the A unit 2-4 is generating a virtual address of the third instruction. Meanwhile, the I unit 2-2 is cracking the fourth instruction and fetching one of the subsequent instructions. Therefore, in this typical example, there could be five instructions progressing down the production line.

However, since the A unit 2-4 can execute certain software visible register instructions, they are removed from the production line as soon as the execution of those instructions is completed by the A unit. Similarly, when the A unit 2-4 is processing a branch instruction and the conditions of the branch are met, the A unit 2-4 immediately sends the branch address to the I unit 2-2 and that branch instruction will be removed from the production line. This mode and method of operation results in increased throughput as compared to the prior art.

Figure 3:
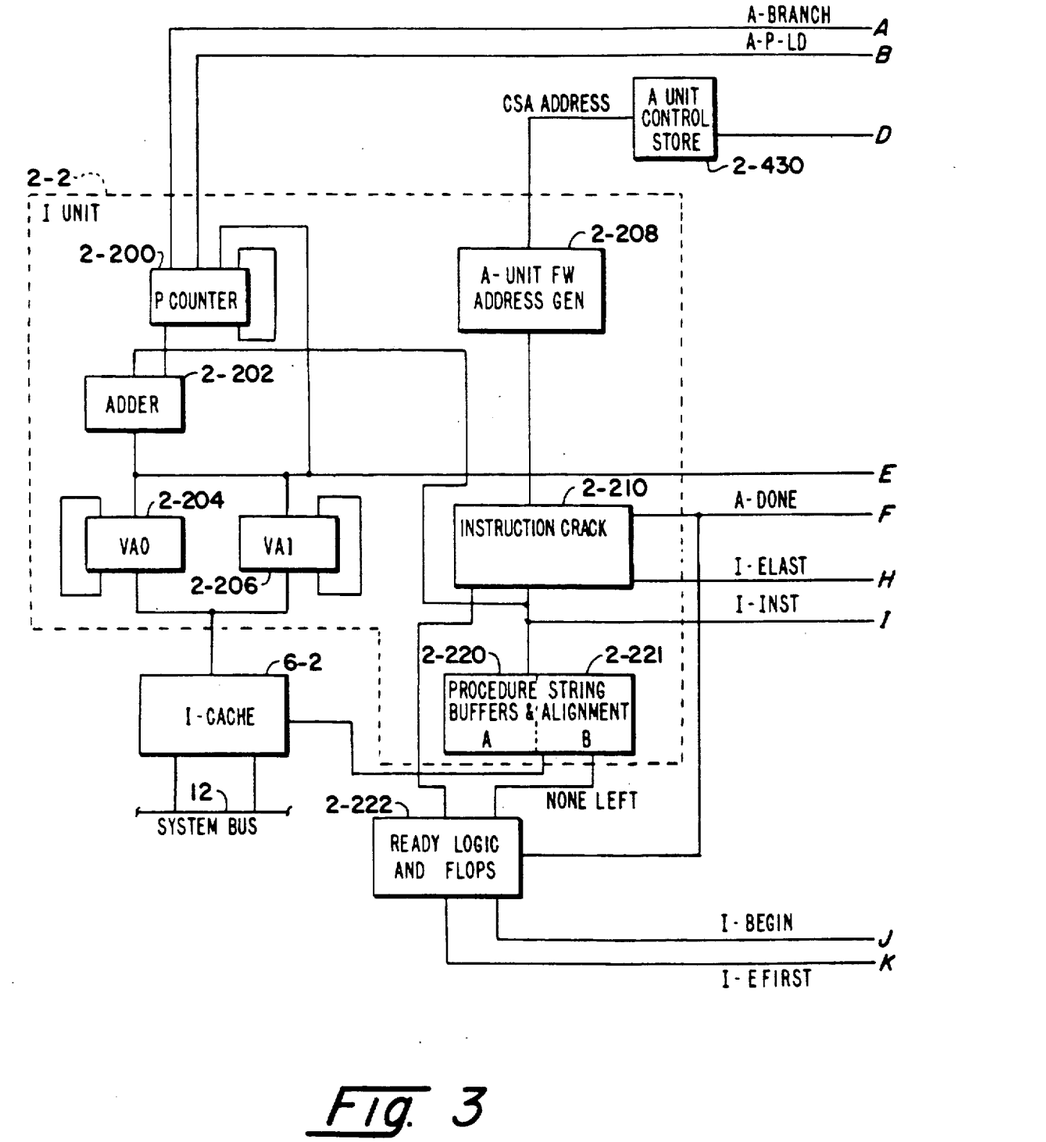
FIGS. 3A, 3B, and 3C are portions of a logic block diagram of major elements of the production pipeline cycles.

FIG. 3 shows in greater detail the elements of the instruction unit 2-2, the A unit 2-4, the execution unit 2-6 and their respective interconnections. The P-counter 2-200 of the instruction unit 2-2 is loaded by the A unit 2-4 with a virtual address. This virtual address is the address in I-cache 6-2 of the location of the next instruction that is to be placed into the pipeline. During the I-FETCH cycle, the virtual address is transferred to I-cache 6-2 via an adder 2-202 and either a register VA0 2-204 or a register VAI 2-206. Either register VA0 2-204 or register VA1 2-206 is used until a branch instruction is fetched. Then, if register VA0 2-204 is active, the address called for by the branch instruction would be stored in register VA1 2-206.

The reason the branch address is held separately in the VA0 2-204 and VA1 2-206 registers is because if it is a conditional branch, the condition may or may not be met. If the condition is not met, then no branch will result. This gives the system the choice of either using or not using the address called for by the branch. The P counter 2-200, under firmware control, is incremented by one for a one word instruction, incremented by two for a double word instruction, or replaced by a branch address.

The instruction is read out of I-cache 6-2 into either string buffers A 2-220 or string buffers B 2-221. Here again, one set of string buffers receives successive instructions from I-cache 6-2 until there is a branch instruction. Then the instruction following the branch instruction is stored in buffers in the other string. For example, if the string buffers A 2-220 were being used, then the instruction following the branch instructions would be stored in the string buffers B 2-221. The throughput is improved by storing both sets of instructions in case the branch conditions are met and the I unit 2-4 fetches the branch string from string buffers B 2-221.

The instruction is read out of I-cache 6-2 into either string buffers A 2-220 or string buffers B 2-221. Here again, one set of string buffers receives successive instructions from I-cache 6-2 until there is a branch instruction. Then the instruction following the branch instruction is stored in buffers in the other string. For example, if the string buffers A 2-220 were being used, then the instruction following the branch instructions would be stored in the string buffers B 2-221. The throughput is improved by storing both sets of instructions in case the branch conditions are met and the I unit 2-4 fetches the branch string from string buffers B 2-221.

The instruction is then sent to the instruction crack and resource control unit 2-210 which determines the kind of instruction it is. That is, if this is a software visible register to register instruction, then it will be executed by the A unit 2-4 if it is a memory instruction that will be executed by the E unit 2-6.

The instruction is sent from the crack unit 2-210 to an A-unit firmware address generator 2-208 which addresses an A-unit control store 2-430. The contents of the addressed location is stored in an RDR (A) register 2-406 in the A unit 2-4. The instruction signals I INSTR 0-31 from the string buffers 2-220 or 2-221 are transferred to the instruction (RINSTR) register 2-400 in the A-unit 2-4. If the instruction is to be executed by the E unit 2-6, it is also stored in an instruction first in a first out register (FIFO) 2-600 in the E unit 2-6. The instruction is also stored in an OP-CODE register 2-402 in the A unit 2-4 under control of a signal I-BEGIN from the I unit 2-4. Both the RINSTR register 2-400 and the OP CODE register 2-402 store double words of 32 bits each. If an instruction requires 2 or 3 double words, then the OP CODE for that instruction remains in the OP CODE register 2-402 while each of the double words of the instruction in turn are stored in the instruction register 2-400.

The output of the OP CODE register 2-402 is used primarily for addressing a register file 2-404 under control of OP CODE and firmware bits stored in the OP CODE register 2-402 and the register RDR (A) 2-406 respectively. The register file 2-404 includes the software visible registers. If the instruction being executed is a memory instruction, then a virtual address is generated and sent to the VMMU 4 via an arithmetic logic unit (ALU) 2-412. Depending upon the instruction being executed by the A unit 2-6, the input to the ALU 2-412 may be applied to the A side, by the RINSTR register 2-400, the OP CODE register 2-402, the register file 2-404 or a program counter 2-416. ALU 2-412 B side inputs are provided by an index shifter 2-410 for index or offset operations, via an adder 2-408 or from register file 2-404. If this is a register instruction, for example, a shift operation of the contents of a software visible register in the register file 2-404, then the output of the register file 2-404 may be applied to the shifter 2-414, be shifted the number of bits specified by the instruction and stored back in the register file 2-404 in the same register from which it was read.

For the conditional branch instruction, signals from RINSTR 2-400 and from the ALU 2-412 are applied to branch logic 2-401. The output signal load signal A-P-LD, enables the P counter 2-200 to accept the branch address signals A-BRANCH which are sent to I-CACHE 6-2.

When the A unit 2-4 has completed the execution of the instruction, an A-DONE signal is sent to the crack unit 2-210 of the I unit 2-2. This informs the I unit 2-2 to send the next instruction stored in the string buffers 2-220 or 2-221 to the A unit 2-4 and if required, to the E unit 2-6. If an instruction calls for execution by the E unit 2-6, then the I unit 2-2 sends that instruction to the instruction FIFO 2-600 under control of signal I-E-LAST and signal I-E-FIRST. These signals control the loading of the instruction FIFO 2-600. The I-BEGIN signal is received by the A unit 2-4 when the CRACK signal is generated, when the system is not in a hold mode, and when no logic block including the clock logic is in a stall mode.

The CRACK signal is generated when the ready logic and flops 2-222 is ready to crack the instruction, the string buffers A 2-220 or string buffers B 2-221 store at least one instruction, and the A unit 2-4 had generated the A-DONE signal indicating that the A unit is available for processing the next instruction.

The I unit 2-2 generates the I-EFIRST and the I-ELAST signals by the ready logic and flops 2-222 if the instruction being cracked is to be executed by the E unit 2-6. Both signals are applied to the I FIFO 2-600. The I-EFIRST signal enables the I-FIFO 2-600 to store a double word instruction. The I-ELAST signal enables the I-FIFO 2-600 to store a single word instruction.

Note that the I unit 2-2 sends the instruction to be executed in the A unit 2-4, and only to FIFO 2-600 if the instruction is to be executed in the E unit 2-6. In the E unit 2-6, the next instruction the FIFO 2-600 will execute is applied to the next address generator 2-602 which generates the E unit control store 2-604 address location. The firmware word is stored in a register RDR (E) 2-606. The instruction FIFO 2-600 stores up to four instructions.

When the A unit 2-4 sends its virtual address to the VMMU 4, the VMMU 4 generates the physical address which addresses the E-cache 6-4. The contents of the addressed location are stored in a data FIFO 2-630 in the E unit 2-6 by signal LD-DAT-0015 for a single word transfer or signal LD-DAT 1631 for a double word transfer. Signal LD-DAT-0015 also increments by one the FIFO 2-630 write address to accept the second word of the transfer if the first word was not at an E-CACHE 6-4 word boundary. These data are the operands on which the instruction will operate. The E-unit 2-6 executes instructions whose operands are stored in software visible registers of register file 2-630. A typical instruction is the multiply instruction.

For this instruction, the A unit 2-4 generates a dummy cycle by sending the virtual address hexadecimal 40 to the VMMU 4. This results in the E-CACHE 6-4 generating a dummy cycle by sending signal LDDAT 1631 to the FIFO 2-630 with a "dummy" operand.

If, in the I unit 2-2, the instruction calls for a branch and has a displacement, then the displacement from the crack unit 2-210 is applied to the adder 2-202 to be added to the contents of the P counter 2-200, stored in either register VA0 2-204 or register VA1 2-206, and applied to the I-cache 6-2.

A multiplier 2-616 is coupled to the A & B ports of register file 2-610 to generate and store partial products in conjunction with the shifter 2-618 and the Q-register 2-620. The partial products are applied to a result multiplexer (MUX) 2-622 and stored in accumulator location in register file 2-610. When the multiplication is completed, the final result is stored in one of the software visible registers of register file 2-610.

A swapper logic 2-612 receives operands from the B side of register file 2-610 for swapping words within double words and swapping bytes within single words. A 16-bit word is made up of two 8-bit bytes. A double word is made up of two 16-bit single words or four 8-bit bytes. A sign extender 2-614 repeats the sign of all the high order positions of a double word to the left of the first significant bit of the double word.

The CT1 and CT2 counters 2-624 are used in the calculation of the exponent of a floating point resultant. A mantissa of a floating point operand is processed through the ALU 2-608 and a shifter 2-618 in a conventional manner.

The software visible registers in both the register files 2-404 with A unit 2-4 and 2-610 in the E unit 2-6 are updated on successive cycles so that they both contain the same information. This is accomplished by firmware signals from register RDR (A) 2-406 which are applied to logic 2-420 to generate an update signal A-UPDT. The A-UPDT signal enables the register file 2-610 and six A-ADR signals which are applied to the address terminals of register file 2-610 to store the data from the D terminal of the register file 2-404 to the D terminal of register file 2-610. Similarly, the E-UPDT signal from register RDR (E) 2-606 enables register file 2-404 to store the data at the address specified by signals E-ADR from logic 2-601 provides. Logic 2-601 signals E-ADR as a result of instruction signals from the instruction FIFO 2-600 and firmware signals from RDR (E) 2-606.

The A unit 2-4 program counter 2-416 stores the address of the next instruction. P counter 2-200 in the I unit 2-2 also stores the address of the next instruction. The reason for the two registers is that, in case of a conditional branch, P counter 2-200 in the I unit 2-2 stores the branch address in case it is to be used, whereas the program counter 2-416 will not store the branch address but stores the next address in the sequence presently being executed.

Figure 4:
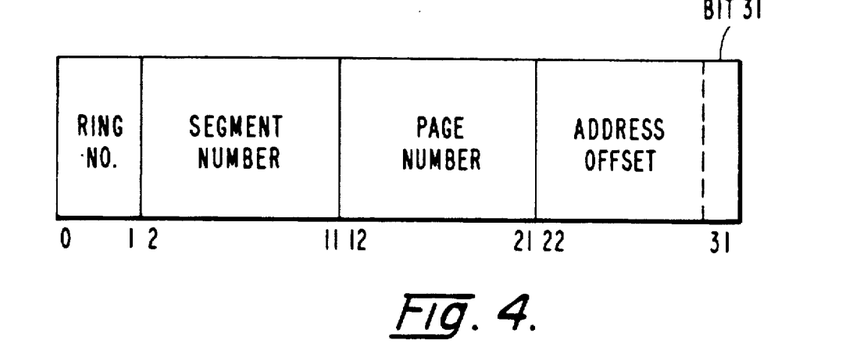
FIG. 4 illustrates the portions of a virtual address according to the preferred embodiment.

Referring next to FIG. 4, the composition of the virtual address according to the preferred embodiment has been described above.

Figure 5:
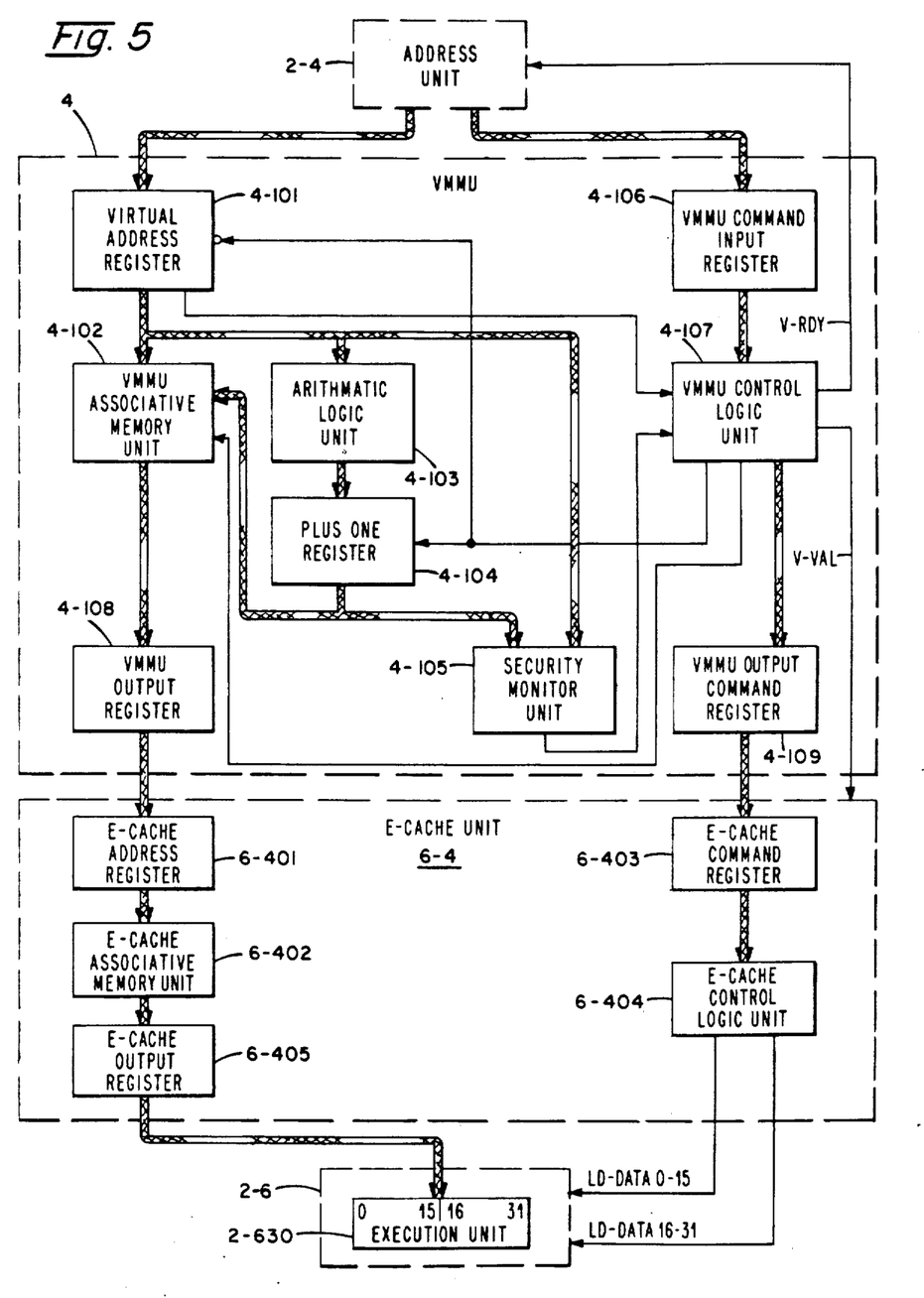
FIG. 5 is a block diagram of the components for performing the virtual address translation according to the present invention.

Referring now to FIG. 5, a block diagram of the data processing unit 2-4 components in the virtual address translation process according to the present invention is shown. In response to a V-RDY signal from VMMU control logic unit 4-107, a virtual address is applied to the virtual address register 4-101 from address unit and command signals are entered in the VMMU command register 4-106, both the virtual address and the command signals derived from address registers. The contents of the virtual address register 4-101 are applied to the arithmetic logic unit 4-103, to the VMMU associative memory unit 4-102, to the VMMU security monitor unit 4-105 and to the VMMU control logic unit 4-107. The output signals from the arithmetic logic unit 4-103 are applied to the plus one register 4-104. The output signals from the plus one register 4-104 are applied to the VMMU associative memory unit 4-102 and to the security monitor unit 4-105. Output signals from the security monitor unit 4-105 are applied to the VMMU control logic unit 4-107. Output signals from the VMMU associative memory unit 4-102 are applied to the VMMU output register 4-108, while the output signals from the VMMU control logic unit 4-107 are applied to the VMMU command output register 4-109.

The output signals from the VMMU output register 4-108 of the VMMU unit 4 are applied to the data FIFO address register 2-630 of the E-cache unit 6-4. The command signals from the VMMU command output register 4-109 are applied to the E-cache command register 6-403 of the E-cache unit 6-4. The output signals from the E-cache read address register 6-401 are applied to the E-cache associative memory unit 6-402. The output signals from the E-cache associative memory unit 6-402 are applied to the E-cache output register 6-405. The output signals from the E-cache command register 6-403 are applied to the E-cache control logic unit 6-404.

The output signals from the E-cache output register 6-405 of the E-cache unit 6-4 are applied to register 2-601 of the execution unit 2-6. The output signals of the E-cache control logic unit 6-404 are applied to the execution unit and control the flow of operands between the E-cache unit and the execution unit.

2. Operation of the Preferred Embodiment

Figure 6:
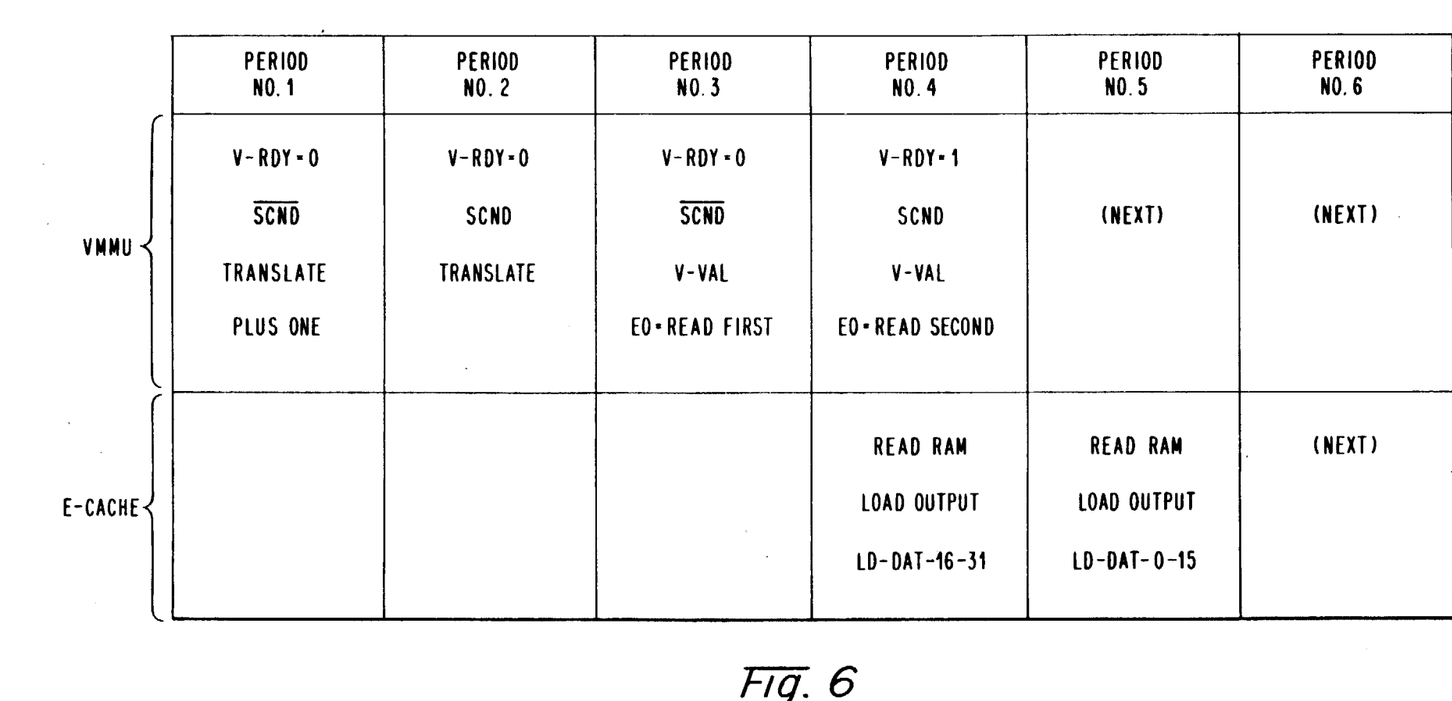
FIG. 6 shows the process of performing the virtual to real address translation as a function of consecutive machine cycles according to the present invention.

The operation of the present invention can be understood by reference to FIG. 5 as interpreted in view of FIG. 6. The V-RDY signal controls the transfer of the virtual addresses from the address unit 2-4 to the virtual address register 4-101. During the periods (i.e., machine cycles) 1-3, the current virtual address is stored in the virtual address register 4-101. During period 4, the processing of the virtual address will be complete and the V-RDY signal is applied to the address unit 2-4 to insure that the next virtual address will be stored in the virtual address register during the next period. The V-RDY signal also causes command signals to be read into the VMMU command register so that these signals will be available during period 1 and during period 5. For the present invention, the command signals in the VMMU command input register 4-106 indicate that an operand is to be read from the E-cache unit. In addition, the state of bit position 31 in the virtual address register 4-101 is applied to the VMMU control logic unit 4-107. The read command signals in conjunction with a logic "1" in bit position 31 results in the procedure for reading an operand that crosses the double word boundary. The contents of the virtual address register are applied to arithmetic logic unit 4-103 wherein a "1" is addressed to the least significant bit position from the virtual address register 4-101 in response to the PLUS ONE signal. The result from the arithmetic logic unit 4-103 is stored in the plus one register 4-104. The contents of the plus one register 4-104 are forwarded in the presence of the SCND signal while the contents of the virtual address register 4-101 are forwarded in the presence of the SCND NOT signal. The SCND NOT signal of period 1 indicates that the contents of virtual address register 4-101 are applied to the input terminals of the VMMU associative memory unit 4-102 and to the security monitor unit 4-105. The TRANSLATE signal causes the security monitor unit 4-105 to determine the attributes associated with the segment number, e.g., via a look-up table, and to compare the segment number attributes with the ring number of the virtual address. The result of this comparison is applied to the VMMU control logic unit 4-107. When the comparison is negative, the program is not permitted access to the segment and a special routine must be entered to determine how to respond to the lack of access. When the comparison is positive the signals of the period 2 are imposed by the VMMU control logic unit 4-107.

In period 2, the SCND signal causes the contents of the plus one register 4-104 to be applied to the VMMU associative memory unit 4-102 and to the security monitor unit 4-105. The TRANSLATE signal causes the security monitor unit 4-105 to compare the attributes associated with the segment number with the ring number. When this comparison is positive, then the two double word operands having the required two words can be accessed by the program and the procedure is allowed to continue. As part of the security checking procedure, a determination can be made whether the page (or pages) including the two words of the required double word are currently stored in the memory unit 8.

In period 3, the reading of the two words of the double word having been determined not to be prohibited, the SCND NOT signal permits the contents of the virtual address register to be applied to the VMMU associative memory unit 4-102. The presence of the ECTL signal causes the associated real address to be retrieved from the VMMU associative memory unit 4-102 and applied to VJ output register 4-108. The presence of the V-VAL signal causes the E-cache read address register 6-401 to have the contents of the VMMU output register 4-108 applied thereto.

With respect to the access to the VMMU associative memory unit 4-102, it will be clear to those skilled in art of virtual memory management techniques that a portion of the address from the virtual address unit is not translated and can be applied directly to the VMMU output register. These data paths have not been illustrated to focus on the operation of the present invention.

In period 4, the SCND signal causes the contents of the plus one register 4-104 to be applied to the VMMU associative memory unit 4-102 while the EO signal causes the output signals of the VMMU associative memory unit 4-102 to be applied to the VMMU output register 4-108. The V-VAL signal causes the contents of the VMMU output register to be applied to the E-cache read address register. The current contents of the E-cache read address register 6-401 is applied to the E-cache associative memory unit 6-402 and, in the presence of the READ RAM signal, the output signals from the E-cache associative memory unit 6-402 are applied to the E-cache output register 6-405. The V-VAL signals have permitted signals from the VMMU control logic unit 4-107 to be applied to the E-cache control logic unit 6-404 via the VMMU command output register 4-109 and the E-cache command register 6-403. The E-cache control logic unit 6-404 applies the READ RAM signal and, during period 3, applies the LOAD OUTPUT signal to the E-cache output register 6-405, and applies the LD-DATA 16-31 to the execution unit 2-6. The LD-DATA 16-31 cause the second word of the double word operand stored in E-cache output register 6-405 to become the first word of the resulting operand stored in register 2-601. In period 4, the V-RDY signal causes the next virtual address to be entered in the virtual address register 4-101.

In period 5, the contents of the E-cache real address register 6-401 are applied to the E-cache associative memory unit 6-402 as a result of the READ RAM signal and the LOAD OUTPUT signal from the E-cache control logic unit 6-404. The LD-DATA 0-15 signal for the E-cache control logic unit to the execution unit 2-6 causes the first 16 bits of the double word stored in the E-cache output register 6-405 to become the second 16 bit word in the double word stored in register 2-601 of the execution unit 2-6.

The description of the operation of the preferred embodiment requires four period (machine cycles in the pipelined data processing unit) to complete. It will be clear that with appropriate logic apparatus and control signals, the access of the VMMU associative memory can be performed concurrently with the operation of the security monitor unit and the resulting real address or resulting operand word stored pending the results of the attribute/ring number comparison. Because the crossing of a double word boundary is relatively rare in the preferred embodiment, the increased efficiency data processing unit instruction execution does not warrant the additional apparatus.

Although the present invention is adapted to operate with a data processing unit described in relation to FIGS. 1-3, it will be clear to those skilled in the art that the technique of translation of a virtual address that crosses a boundary of a group of words is applicable to other data processing unit configurations.

It will be further clear to those skilled in the art that the performance of the present invention can be increased by placing a buffer storage unit in the position of the VMMU output register 4-108 so that the access to the VMMU associative memory unit 4-102 can function simultaneously with the testing by the security monitor.

The foregoing description is provided to illustrate the operation of the preferred embodiment and is not meant to limit the scope of the invention. The scope of the invention is to be limited only by the following claims. From the foregoing description, many variations will be apparent to those skilled in the art that would yet be encompassed by the spirit and scope of the invention.

What is claimed is:

1. A data processing unit, said data processing unit identifying each double word operand by a virtual address, said virtual address including a ring number identifying attributes of said each double word operand, said virtual address including a segment number identifying a group of addresses, said data processing unit comprising:

a execution unit for processing requested and aligned double word operands;

a cache memory unit for storing double word operands, wherein said cache memory unit can store an unaligned double word operand, an unaligned double word operand including a first word in a first double word operand and including a second word in a second double word operand;

a virtual memory unit including:

identification means for identifying by means of a first virtual address that a requested and aligned double word operand is stored as an unaligned double word operand, said first virtual address identifying a first double word operand having a first word of said requested and aligned double word operand;

address generation means responsive to said identification means for calculating a second virtual address from said first virtual address, said second virtual address identifying a second double word operand having a second word of said requested and aligned double word operand;

security means for comparing execution attributes of said first virtual address with attributes of said second virtual address, said execution attributes being determined by a segment number of each virtual address, wherein said security means initiates a special procedure when a comparison of said execution attributes associated with said first and said second virtual address is false; and memory means responsive to said first virtual address for providing a first real address of said first double word operand when said comparison of execution attributes is positive, said memory means responsive to said second virtual address for providing a second real address of said second double word operand when said comparison of execution attributes is positive;

cache means storing double word operands at read addresses, said cache means for retrieving said first double word operand having said first word in response to said first real address, said cache means for retrieving said second double word operand having said second word in response to said second real address; and alignment means responsive to control signals and to said first and second double word operands retrieved from cache means for providing said requested and aligned double word operand.

2. The data processing unit of claim 1 wherein said address generation means includes means for adding a logic "1" to a least significant address position of said first virtual address to obtain said second virtual address.

3. The data processing unit of claim 1 wherein said alignment means includes exchange means for exchanging word positions of a selected word in a first register storing said first operand word pair and a selected word in a second register storing said second operand word pair, said exchange means providing said aligned double word operand.

4. The data processing unit of claim 1 wherein said identification means is responsive to a READ command and to a logic "1" in a selected bit position of said first virtual address for identifying a double word operand having words stored in two memory locations.

5. The method of aligning a non-aligned double word operand having a first word and a second word stored across a double word boundary, an aligned double word operand being required for operand processing in an execution unit of a data processing unit, said method comprising the steps of:

identifying said first word of said non-aligned double word operand by a first virtual address having a first logic signal in a preselected bit position;

calculating a second virtual address from said first virtual address, said second address identifying said second word;

when said second virtual address is in a second memory segment and said first virtual address is in a first memory segment, comparing attributes associated with said first memory segment with attributes associated with said second memory segment;

when said comparing step is positive and when said first and said second virtual address are a same memory segment, translating said first virtual address to provide a first real address and translating said second virtual address to provide a second real address;

retrieving a double word operand having said first word from a local memory unit location identified by said first real address and positioning said first word in a first word position in a double word register; and retrieving a double word operand having said second word from a local memory unit location identified by said second real address and positioning said second word in a second word position of said double word register, said double word register storing said double word operand.

6. The method of claim 5 wherein said comparing step includes a step of designating execution attributes of each segment with a ring number.

7. The method of claim 5 wherein said calculating step includes a step of adding a logic "1" to a least significant bit position of said first virtual address to obtain said second virtual address.

8. The method of claim 5 wherein said comparing step for said first virtual address and said second virtual address occurs during consecutive data processing unit machine cycles.

9. The method of claim 8 wherein said retrieving said first word double operand and retrieving said second word double word operand occur during consecutive data processing unit machine cycles.

10. The method of claim 8 wherein said positioning said first word step occurs during execution of said retrieving said second word double word operand.

11. Apparatus for providing an aligned double word operand to an execution unit of a data processing unit, wherein said data processing unit identifies an unaligned double word operand by a first virtual address with a selected logic signal in a selected position, said apparatus comprising:

an identification unit responsive to said selected logic signal of said first virtual address for determining when said first virtual address identifies an unaligned double word operand to be transferred to said execution unit;

address means for providing a second virtual address from said first virtual address by adding a logic "1" signal to a least significant operand defining position, said second virtual address identifying a second double word operand having said second word stored therewith;

security monitor means responsive to said first virtual address and to said second virtual address for determining when said first virtual address is part of a first segment and said second virtual address is part of a second memory segment, said security monitor units determining when said first segment and said second segment have compatible execution attributes, said security monitoring unit initiating a special procedure when said execution attributes are not compatible;

associative memory means for providing a first real address in response to said first virtual address and for providing a second real address, in response to said second virtual address, and in response to a signal from said security monitor means indicating that said first virtual address and said second virtual address have compatible attributes;

cache memory means responsive to said first real address for providing said first double word operand and responsive to said second real address for providing said second double word operand, said first word being included in said first double word operand word pair and said second word being included in said second double word operand, and alignment means for positioning said first word relative to said second word to provide said aligned double word operand for said execution unit.

12. The apparatus of claim 10 wherein said security monitor means determines when said second real address is not stored in said cache memory means and, when said first and said second virtual address execution attributes are compatible, retrieving said double word operand for storage in said cache memory means.

13. The apparatus of claim 11 wherein said address means includes an arithmetic logic unit for adding a logic "1" to a least significant bit position of a first virtual address offset.

14. The apparatus of claim 11 wherein said security monitor means includes means for determining when an operand associated with a virtual address is stored in said cache memory means, said security monitor means initiating procedure for storage of said associated operand in said cache memory means when said associated operand is not present.

15. The apparatus of claim 11 wherein a first portion of said first virtual address is a ring number, said ring number identifying execution attributes of a currently operating program.

16. The apparatus of claim 11 wherein said security monitor means includes a table of segment numbers with execution attributes associated with said segment numbers.

* * * * *